United States Patent
Blassmann et al.

(10) Patent No.: US 8,075,022 B2
(45) Date of Patent: Dec. 13, 2011

(54) FLUIDICALLY OPERATED DEVICE

(75) Inventors: Lars Blassmann, Esslingen (DE); Metin Giousouf, Esslingen (DE); Uwe Metzger, Durnau (DE)

(73) Assignee: Festo AG & Co. KG, Esslingen (DE)

( * ) Notice: Subject to any disclaimer, the term of this patent is extended or adjusted under 35 U.S.C. 154(b) by 241 days.

(21) Appl. No.: 12/309,700

(22) PCT Filed: Mar. 3, 2007

(86) PCT No.: PCT/EP2007/001834
§ 371 (c)(1),
(2), (4) Date: Jan. 26, 2009

(87) PCT Pub. No.: WO2008/014829
PCT Pub. Date: Feb. 7, 2008

(65) Prior Publication Data
US 2009/0189390 A1    Jul. 30, 2009

(30) Foreign Application Priority Data
Jul. 29, 2006   (DE) .................... 20 2006 011 624 U

(51) Int. Cl.
*F16L 25/00* (2006.01)
(52) U.S. Cl. ............... 285/325; 285/124.5; 285/124.4
(58) Field of Classification Search ............ 429/180, 429/214; 439/252, 180, 214, 299, 345, 347, 439/355; 438/299, 345; 285/8, 24, 26, 29, 285/84–86, 91, 124.1, 124.3, 194, 200, 238, 285/239, 244, 305, 319, 320, 331, 423, 921, 285/325, 326, 124.5, 124.2, 124.4; 403/353; 604/249; 251/7, 9
See application file for complete search history.

(56) References Cited

U.S. PATENT DOCUMENTS
| | | | | |
|---|---|---|---|---|
| 2,839,073 A * | 6/1958 | Marsh | ............................ | 137/232 |
| 3,758,138 A * | 9/1973 | Roseman | .................... | 285/139.3 |
| 3,929,356 A | 12/1975 | DeVincent et al. | | |
| 4,453,747 A * | 6/1984 | Bimba | ........................... | 285/305 |
| 4,600,221 A * | 7/1986 | Bimba | ............................ | 285/91 |

(Continued)

FOREIGN PATENT DOCUMENTS
DE    2849133    5/1980
(Continued)

*Primary Examiner* — David E Bochna
(74) *Attorney, Agent, or Firm* — Hoffman & Baron, LLP

(57) ABSTRACT

The application relates to a device in accordance with fluid technology (1), having at least one connecting body (2), through which at least one fluid-carrying conduit (5) extends and to which an elastic fluid-carrying hose (3) can be connected by means of a connecting arrangement (16). The connecting arrangement (16) contains a holding slide (25), which is displaceably seated on the connecting body (2) and through which a pass-through opening (32) extends, which has an insertion section (33) and a holding section (34), which is narrower than the latter. The connected fluid-carrying hose (3) itself has been directly inserted through the pass-through opening (32) of the holding slide (25) into the fluid-carrying conduit (5). The width of the pass-through opening (32) in the area of the insertion section (33) is greater, and less in the area of the holding section (34), than the nominal exterior diameter of the fluid-carrying hose (3), so that in the release position of the holding slide (25) the latter can be introduced unhindered through the pass-through opening (32), and in the holding position of the holding slide (25) it is clampingly fixed in place, while its hose wall is being deformed.

23 Claims, 6 Drawing Sheets

U.S. PATENT DOCUMENTS

| | | | |
|---|---|---|---|
| 5,040,831 A * | 8/1991 | Lewis | 285/305 |
| 5,181,749 A * | 1/1993 | Feichtiger et al. | 285/26 |
| 5,343,889 A * | 9/1994 | Jaw | 137/232 |
| 5,453,098 A * | 9/1995 | Botts et al. | 604/249 |
| 5,813,703 A * | 9/1998 | Reinholz | 285/179 |
| 5,865,474 A * | 2/1999 | Takahashi | 285/124.1 |
| 6,222,128 B1 * | 4/2001 | Gretz | 174/72 A |
| 7,052,051 B2 * | 5/2006 | Gaffe et al. | 285/308 |
| 2009/0283543 A1 * | 11/2009 | Schroeder et al. | 222/144.5 |

FOREIGN PATENT DOCUMENTS

| | | | |
|---|---|---|---|
| DE | 3705136 A * | 9/1988 | |
| DE | 4209000 | 5/1993 | |
| DE | 19755743 | 3/1999 | |

* cited by examiner

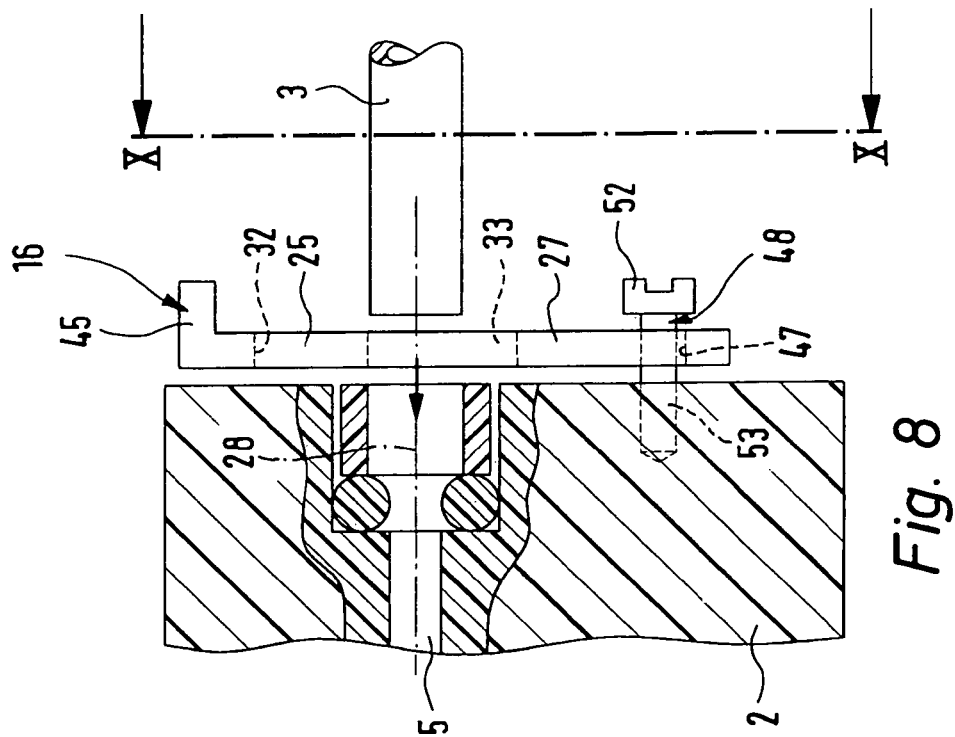
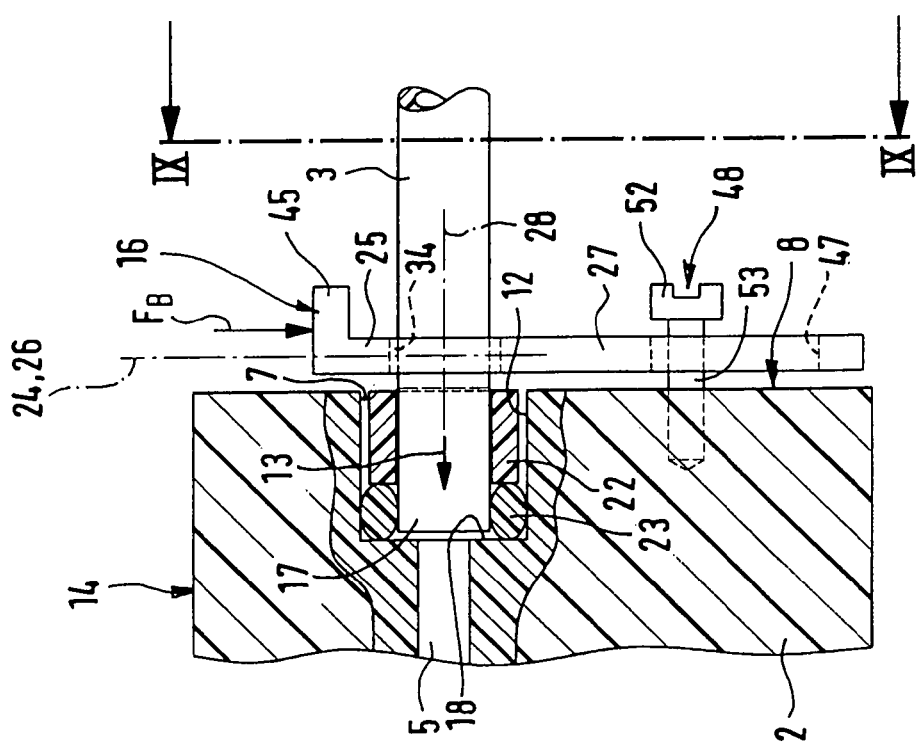

FLUIDICALLY OPERATED DEVICE

This application claims priority based on an International Application filed under the Patent Cooperation Treaty, PCT/EP2007/001834, filed Mar. 3, 2007.

BACKGROUND OF THE INVENTION

The invention relates to a device in accordance with fluid technology, having at least one connecting body, through which at least one fluid-carrying conduit extends and terminates at the exterior of the connecting body in a connecting opening, and having at least one elastic fluid-carrying hose with elastomeric properties, which is or can be connected with the at least one fluid-carrying conduit by means of a connecting arrangement by a plug-in connection, wherein the connecting arrangement comprises a holding slide, which is or can be seated on the connecting body so that it is displaceable in the direction of an actuating axis extending transversely in respect to the longitudinal axis of the connecting opening, and through which a pass-through opening extends, which has an insertion section, and a holding section, which is narrower than the latter and adjoins it in the direction of the actuating axis, wherein the holding slide can be selectively positioned in a release position, in which the insertion section is aligned with the connecting opening, and in a holding position, in which the holding section is aligned with the connecting opening.

A device in accordance with fluid technology of this type can for example comprise a valve arrangement, which has a connecting body which makes possible the releasable connection of fluid-carrying hoses leading to consumers.

A device in accordance with fluid technology of the type mentioned at the outset, which is formed by a braking system in a motor vehicle, is disclosed in DE 2 849 133 A1. A connecting body formed by a valve housing is equipped here with several fluid-carrying conduits, each one of which terminates via respective connection openings at the exterior of the valve housing. A brake line can be connected to each connecting opening, wherein the connecting device employed for this has a connecting plug and a holding slide assigned to the latter. The brake line is pushed on a connecting socket of the connecting plug and is connected to the valve housing by means of the connecting plug. This connection is accomplished by plugging the connecting plug into the associated connecting opening, and this by passing it through a pass-through opening formed in the holding slide. The pass-through opening has a keyhole contour and, by displacing the holding slide, can be positioned such that either an insertion section of greater diameter is aligned with the connecting opening in a release position or, in a holding position, a holding section of a lesser diameter. In the holding position the slide engages a circumferential groove of the connecting plug with slide sections which extend from the sides of the holding section and locks the connecting plug, so that it is axially fixed in place on the connecting body.

For the releasable connection of the fluid-carrying hoses of this known device it is absolutely necessary to equip the respective fluid-carrying hoses with a plug-like connecting piece. The connecting plug is always plugged in or pulled out for making or releasing the connection, while the fluid-carrying hose always remains on the connecting plug. Therefore the hose system of the device in accordance with fluid technology requires a relatively large outlay in manufacturing technology and entails a relatively cumbersome manipulation.

It is also already known to design the connecting measures for fluid-carrying hoses in devices in accordance with fluid technology in such a way that the interface for making and releasing the fluid connections is directly assigned to the respective fluid-carrying hose. The latter can be fixed in place, without prior equipping it with a connecting plug, directly in a connecting device assigned to a connecting body. The prior art of this type is disclosed in DE 1 975 574 C1, for example. If very small hose cross sections are involved, the difficulty in manipulating such connecting devices is disadvantageous, in particular for releasing a fluid-carrying hose.

U.S. Pat. No. 4,600,221 already describes a connecting system for flexible hoses, in which a hose can be directly fixed in place by a holding slide. However, for inserting and releasing the hose it is necessary here to remove the holding slide every time. Different from the arrangement in accordance with DE 2 849 133 A1, in this case the wider, and not the narrower, section of the opening of the holding slide is used for holding the hose in place.

SUMMARY OF THE INVENTION

It is the object of the present invention to create a device in accordance with fluid technology, which contains cost-effective and easy to manipulate measures for connecting fluid-carrying hoses.

For the attainment of this object it is provided in connection with a device in accordance with fluid technology of the type mentioned at the outset that the connected fluid-carrying hose itself is directly plugged through the pass-through opening of the holding slide into the connecting opening of the connecting body, and that the width of the pass-through opening in the area of the insertion section is greater, and less in the area of the holding section, than the nominal exterior diameter of the fluid-carrying hose such, that in the release position of the holding slide the fluid-carrying hose can be plugged unhindered through the pass-through opening into the connecting opening and can be pulled out of it again, and that in the holding position of the holding slide it is clampingly fixed in place, while its hose wall is being deformed by the slide sections which laterally delimit the holding section.

The connection principle of DE 2 849 133, which up to now had only been employed for locking purposes, is therefore employed in a modified form for the direct clamped fastening of fluid-carrying lines. An advantage is connected with this in such a way that an additional connecting plug can be omitted. The fluid-carrying hose itself communicates directly with the holding slide. Its pass-through opening is designed in such a way that the insertion section makes possible a problem-free passing-through of the fluid-carrying line in case the latter is to be connected or removed. For fixing the plugged-in fluid-carrying hose in place, the holding slide is displaced out of the release position into the holding position, so that its holding section which, in comparison with the nominal exterior diameter of the fluid-carrying hose, is pushed onto the exterior circumference of the fluid-carrying line similar to a rider, which causes an at least slight deformation of the hose walls of the fluid-carrying hose and results in clamping of the fluid-carrying hose. As a rule, the fluid-carrying hose will here be minimally radially constricted which, however, does not have a marked effect on the through-put of fluids. In addition to the purely friction-related contact, the slight constriction of the fluid-carrying hose also causes a certain additional positive connection in the longitudinal direction of the fluid-carrying hose, which resists the undesired pull-out of the fluid-carrying hose. With an appropriate design of the slide section acting on the hose wall, it is also possible for a slight penetration of the sliding holder into the hose wall to occur which, based on the positive connection occurring in the course of this, results in a further increase of the pull resistance of the provided connection. For releasing the connected fluid-carrying hose it is merely necessary to shift the holding slide back into the release position again, so that the holding section is removed from the exterior circumference of the fluid-carrying hose, and the fluid-carrying hose comes to lie in the insertion section. It is then possible to pull the fluid-carrying hose out without hindrance.

Advantageous further developments of the invention ensue from the dependent claims.

In a particularly useful embodiment, the pass-through opening is designed to be comparable with a keyhole suitable for a key with a key bit. The transition areas between the two slide sections which delimit the two opening sections can in particular be rounded off, so the holding slide can be anchored on the fluid-carrying hose by means of a comparatively small actuating force.

It is possible to achieve a particularly intimate positive engagement with the hole wall if the slide sections, which delimit the holding section, have a cross-sectional contour which is tapered in the direction of the holding section, in particular is comparable to a cutting edge.

For optimally guiding the holding slide in the course of its displacement between the two possible positions, the holding slide can have at least one elongated hole extending in the direction of the actuating axis, through which a bolt extends, which is fixed in place on the connecting body and protrudes away from it. This bolt can function as a guide bolt. Furthermore, if required, this bolt can also constitute a stop which, in cooperation with the slide sections which delimit the longitudinal hole at the ends, defines the maximum displacement path for the holding slide.

The bolt passing through the holding slide can also be constituted by the shaft of a tensioning screw. This tensioning screw can be screwed to a greater or lesser extent into the connecting body, so that the holding slide can be clamped in place between the screw head and the connecting body, if it is intended to releasably fix a set slide position.

The holding slide is a component which preferably is separate from the connecting body. In this case it can be made of metal in particular. However, making the holding slide and the connecting body in one-piece is also possible, in which case their realization from a plastic material would be selected.

The plastic variation will be preferred in particular if the holding slide is suspended from the connecting body in a movable manner by means of an elastically deformable hinge section. By means of this suspension it is possible to achieve in very a simple manner a connection between the holding slide and the connecting body which is secure against loss. The elasticity of the hinge section is in particular designed in such a way that the holding slide can be displaced in relation to the connecting body at least in the direction of its longitudinal axis, and can usefully also be pivoted against the connecting body and away from it.

For example, with the holding slide pivoted away from the holding body, a fluid-carrying line to be connected can be pushed through the insertion section of the holding slide and can be placed in an oblique orientation against the connecting opening. Subsequently the holding slide is pivoted against the connecting body, along with a simultaneous axial displacement, so that in the area of its connecting end the fluid-carrying line becomes more and more aligned in respect to the connecting opening until it is finally plugged-in to the desired extent. In a final work step, the holding slide, which has now been pivoted against the holding body, can be linearly shifted, so that its holding section is pushed onto the exterior circumference of the fluid-carrying hose.

With an appropriate design of the device it is possible in the course of the last mentioned displacement process to cause locking between the holding slide and the connecting body, which prevents the undesired pivoting away of the holding slide from the connecting body. For this purpose a hook structure can be arranged on the holding slide and/or the connecting body which, in the locking position, extends behind an anchoring structure formed on the respectively other element.

It is possible to provide a one-piece connection in particular between the holding slide and the connecting body via the elastically deformable hinge section.

Optimal centering of the fluid-containing hose is achieved if a centering sleeve is inserted into the end section of the fluid-carrying conduit of the connecting body adjoining the connecting opening and surrounding the inserted fluid-carrying hose. In particular, the centering sleeve can be fixed in place by pressure-seating. Because of this there is also the possibility of making use of the same type of connecting body for different hose diameters in that the individual adaptation to the respective hose diameter is made by the insertion of centering sleeves of different interior diameters.

A ring-shaped seal is also usefully provided in the previously mentioned end section of the fluid-carrying conduit, which sealingly surrounds the exterior circumference of the inserted fluid-carrying hose and is simultaneously also in sealing contact with the wall of the fluid-carrying conduit. This seal ring can be axially fixed, secure against loss, in a coaxial orientation between the centering sleeve and an annular step of the fluid-carrying conduit located opposite the latter.

The device in accordance with fluid technology can be equipped with only one connecting device in accordance with the invention, but also simultaneously with several such connecting devices. If the connecting body contains a plurality of connecting openings arranged next to each other in a row, the connecting devices can also be correspondingly placed next to each other in a row. Here the possibility also exists of embodying and arranging the holding slides in such a way that they stabilize each other in their respective positions. In this way the steps required for guiding the displacement of the holding slides can be reduced to a minimum.

The connecting body can for example be a valve support, which is equipped with one or several, preferably electrically actuatable valves. However, the connecting body itself, for example, can also directly be a component of a valve or of a drive mechanism to be operated by the force of a fluid, for example a linear drive or rotary drive.

The device in accordance with fluid technology is particularly laid out for an operation by means of compressed air. However, it is also suitable for being operated by other gases and also liquids.

BRIEF DESCRIPTION OF THE DRAWINGS

The invention will be explained in greater detail in what follows by means of the attached drawings. Shown in the drawings are in.

DETAILED DESCRIPTION OF THE PREFERRED EMBODIMENTS

Figure 1:
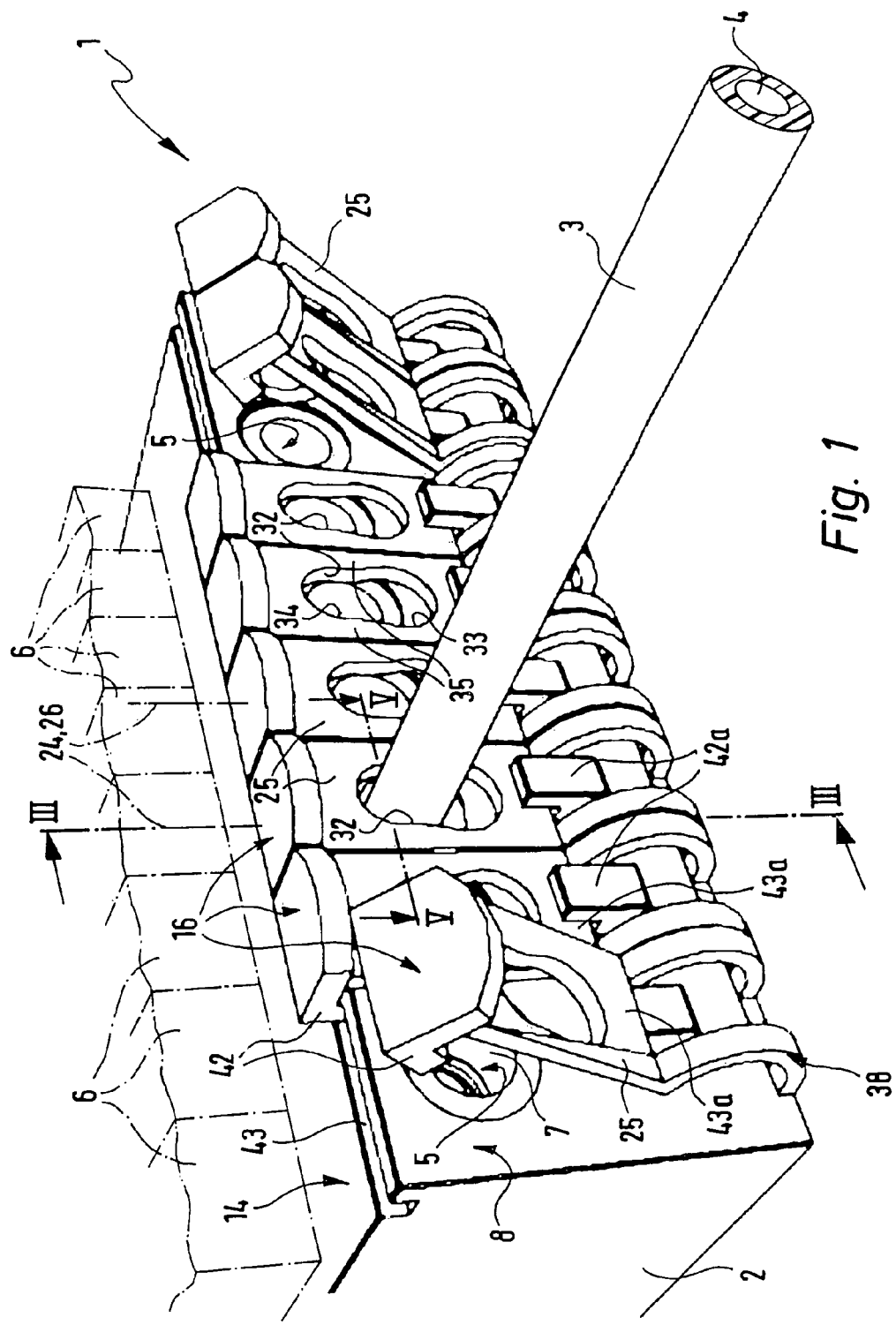
FIG. 1, a perspective partial representation of a possible first embodiment of the device in accordance with fluid technology, in which only one of the several possible connectable fluid-carrying hoses is represented for the sake of clarity, FIG. 2, the arrangement in accordance with FIG. 1 with the holding slides completely pivoted away from the connecting body, FIG. 3, a sectional view through the arrangement in FIG. 1 in accordance with the section line III-III, in which the holding slide is represented assuming the holding position, FIG. 4, the arrangement represented in FIG. 3 with the holding slide pivoted away from the connecting body and at the moment of inserting the fluid-carrying hose to be connected, in which the subsequent course of movement of the holding slide is indicated by arrows, FIG. 5, a sectional view through the arrangement in FIG. 1 in the area of a connecting arrangement in accordance with the section line V-V in FIGS. 1 and 9, in which a possible deformation of the fluid-carrying hose can be seen, FIG. 6, a perspective partial representation of a modified embodiment of the device in accordance with fluid technology, in which again only one of several connectable fluid-carrying hoses is represented, FIG. 7, the arrangement in accordance with FIG. 6 in a sectional view in accordance with the section line VII-VII, in the area of the fluid-carrying conduit and partially broken open, all of this directly prior to tightening a tensioning screw, FIG. 8, the arrangement in accordance with FIG. 1 with the holding slide in the release position, and FIGS. 9 and 10, sectional views through the arrangements in FIGS. 7 and 8 in accordance with the section lines IX-IX and X-X.
Figure 2:
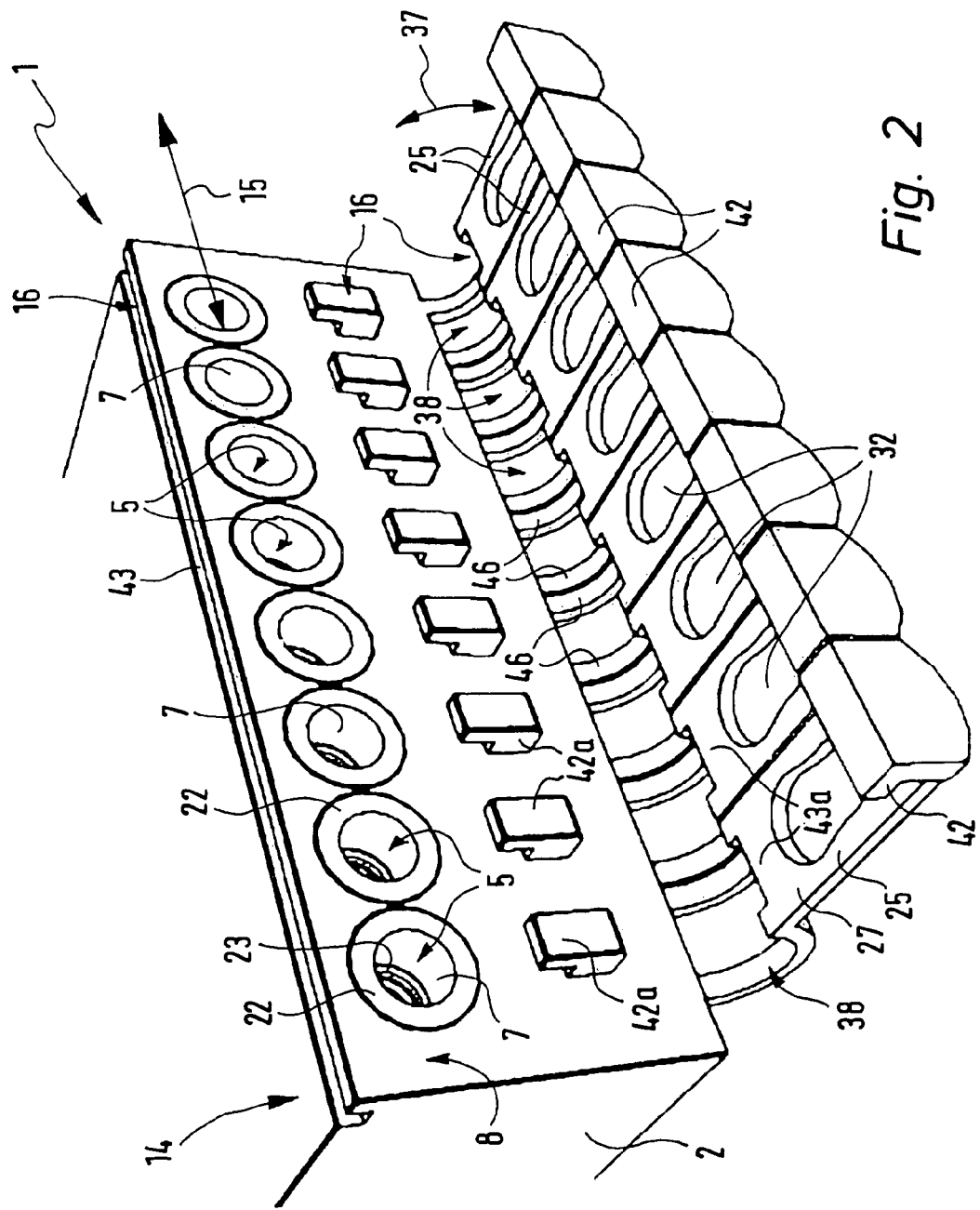
Figure 6:
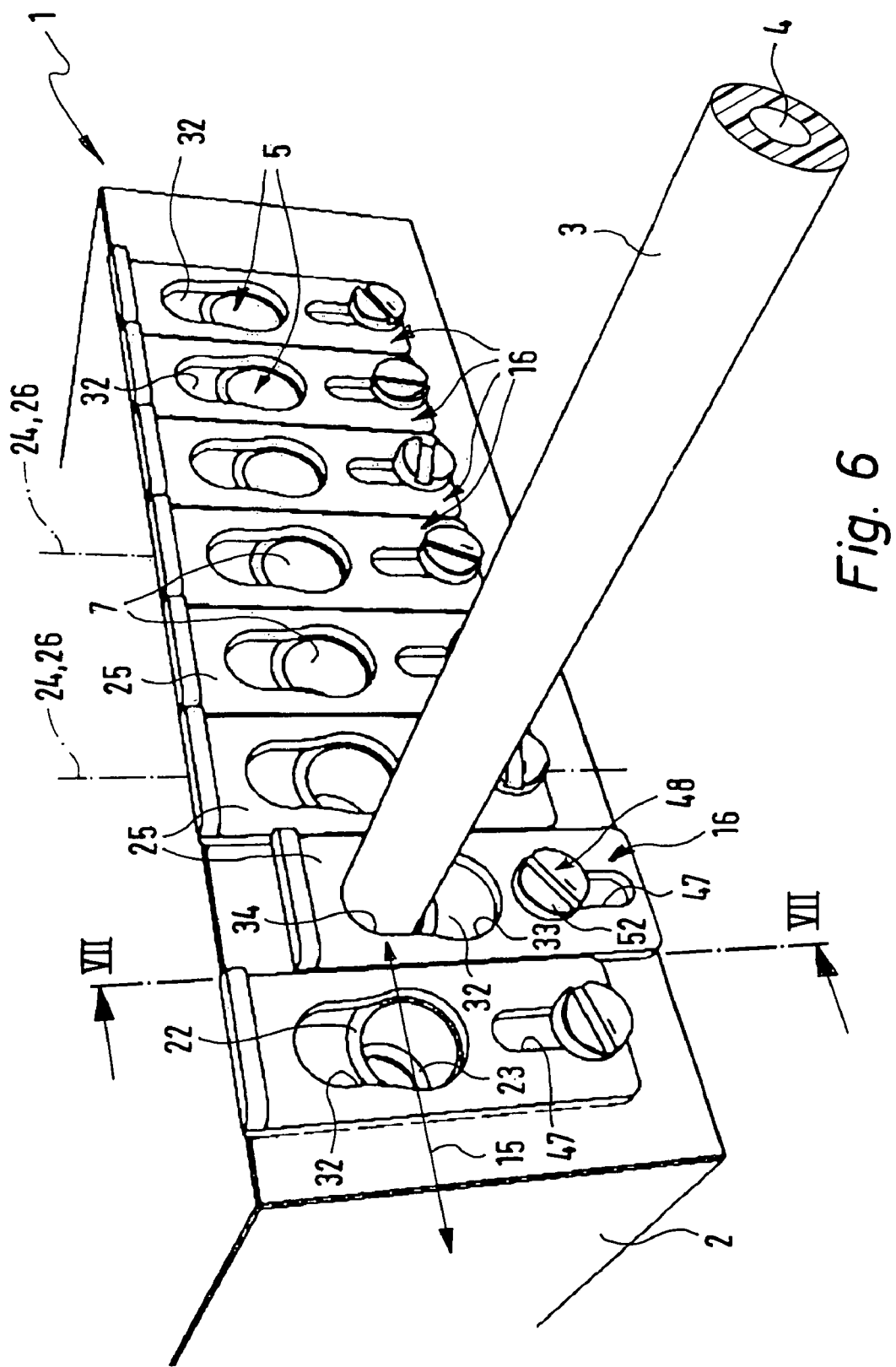

The device 1 in accordance with fluid technology, represented in its totality in FIGS. 1, 2 and 6, contains at least one connecting body, in the exemplary embodiments exactly one such connecting body 2, to which at least one elastic fluid-carrying hose 3 with elastomeric properties can be releasably connected in order to make a fluid-carrying connection between the hose conduit 4 extending through the fluid-carrying hose 3 and a fluid-carrying conduit 5 passing through the connecting body 2.

The connecting body 2 is in particular a valve support, which is or can be equipped with one or several valves 6 suitable for the control of fluid flows. The valves 6 can be electrically actuated, either directly, or indirectly by means of pilot stages. In the drawings they are only indicated in FIG. 1, and only schematically there.

The connecting body 2 is in particular block- or platform-shaped. However, different shapes are also possible.

The fluid-carrying conduits 5 of the exemplary embodiment, each of which can be connected with a fluid-carrying hose 3, are working conduits, through which the supply or removal of pressure medium to or from a non-represented user takes place, for example a drive mechanism which can be actuated by means of the force of a fluid. Each of the fluid-carrying conduits 5 terminates by means of a connecting opening 7 at an exterior face of the connecting body, to be called connecting face 8, and the fluid-carrying hose 3 can be inserted in accordance with the arrow 13 through the connecting opening 7 into the conduit end section 12 of the fluid-carrying conduit 5. Here, the fluid-carrying hose 3 provides the fluid connection between the respective fluid-carrying conduit 5 and the external user.

The fluid-carrying conduits 5 extend in the interior of the connecting body 2 and terminate with their ends opposite the connecting openings 7 in an equipment face 14, at which the valves 6 are installed. They communicate there with conduits of the valve 6.

In a manner not represented in detail, at least one supply conduit and at least one removal conduit pass through the connecting body 2 as a rule, through which a central supply and removal of the pressure medium takes place. These conduits terminate in the equipment faces 14 in such a way that they communicate with all valves 6.

In a non-represented embodiment the valves 6 are integrated into the connecting body 2. In particular, the connecting body 2 can be a direct component of one or several valves by constituting, for example, a valve housing in accordance with a non-represented structure.

Different from the represented multiple equipment with connecting openings 7 suitable for connecting a fluid-carrying hose 3, the connecting body 2 can also only have one single such connecting opening 7.

If the connecting body 2 contains a plurality of connecting openings 7, these are usefully arranged one following another in a line-up direction indicated by a two-headed arrow at 15. In particular, the line-up direction 15 can coincide with the longitudinal direction of the connecting body 2.

The connecting body 2 can be a uniform body, which is not broken up in the longitudinal direction, or it can be a segmented structure. In that case the individual segments can each have at least one of the connecting openings 7 and these are placed against each other, in particular releasably, in the line-up direction 15, forming a component.

Because of their elasticity, the connectable fluid-carrying hoses 3 can be easily bent. They can also be cut to the respectively desired length without problems by means of a suitable cutting tool. They are plastic hoses, preferably made of a polyurethane material.

A connecting arrangement 16 for a releasable, clamping fixation in place of any arbitrary fluid-carrying hose 3 is assigned to each connecting opening 7. The connecting arrangement 16 as a whole is a part of the connecting body 2. No components of the connecting arrangement 16 are found on the fluid-carrying hose 3.

The connecting arrangements 16 make possible the connection of the associated fluid-carrying hoses 3 by means of a simple plug-in connection. For releasing the fluid connection, the fluid-carrying hose 3 is simply pulled out of the associated connecting arrangement 16 after previous manipulation.

Figure 3:
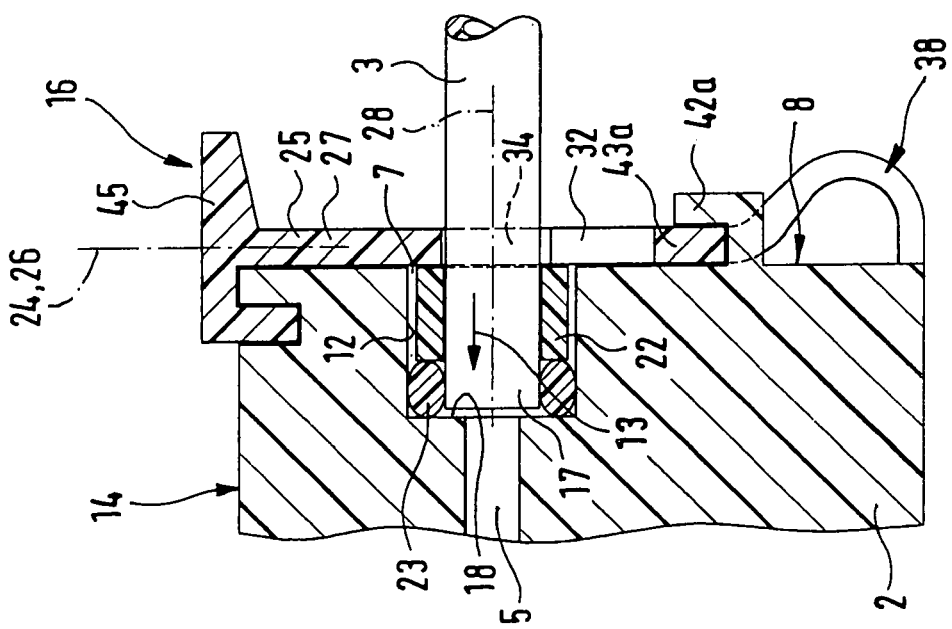

It is very easy to see by means of FIGS. 3 and 7 in particular that with its end section, identified as the connecting end 17 in what follows, the connected fluid-carrying hose 3 dips through the connecting opening 7 into the adjoining conduit end section 12. The insertion depth is limited by a limitation face 18, which is part of an annular groove in the transition area between the conduit end section 12 and the following longitudinal section of the fluid-carrying conduit 5 and is axially outward oriented. In the course of the insertion, the fluid-carrying hose 3 contacts the limitation face 18 with the front face of its connecting end 7.

The connecting end 17 of the inserted fluid-carrying hose 3 is supported in the radial direction in respect to the connecting body 2. The connecting body 2 itself can directly provide the support function, if the conduit end section 12 has an interior diameter corresponding to the nominal exterior diameter of the fluid-carrying hose 3.

Different from this, in the exemplary embodiments the conduit end section 12 has a larger cross section than the fluid-carrying hose 3. The space between them is filled by a centering sleeve 22, which has been inserted into the conduit end section 12 and has preferably been pressed into it. Its interior diameter substantially corresponds to the nominal exterior diameter of the fluid-carrying hose 3, and it can be seen that by the use of centering sleeves 22 of different interior diameters it is possible to provide an adaptation of the connecting body 2 to fluid-carrying hoses 3 with different nominal exterior diameters.

The centering sleeve 22 can a metallic sleeve, however, it is preferably made of a plastic material.

A seal ring 23 is furthermore located in the conduit end section 12. It is arranged in such a way that the connecting end 17 of the inserted fluid-carrying hose 3 passes through it and the ring rests sealingly against its exterior circumference. At the same time it is sealingly supported on the delimiting surface of the conduit end section 12. The escape of pressure medium from the fluid-carrying hose 3 is prevented by this.

Usefully, in a coaxial arrangement in respect to the centering sleeve 22, the seal ring 23 is placed axially between the centering sleeve 22 and the limitation face 18. In this way it is maintained in a manner secure against loss in the conduit end section 12 by the centering sleeve 22.

Each connecting arrangement 16 contains a holding slide 25, which can be displaced in relation to the connecting body 2 in the direction of an actuating axis 24. In particular, the holding slide 25 is an elongated structure, and its longitudinal axis 26 preferably coincides with the actuating axis 24.

The holding slide 25 is placed upstream of the connecting face 8. A holding slide 25 extends in front of each connecting opening 7 and covers the associated connecting opening 7 to a larger or lesser degree as a function of its position.

Preferably the holding slide is embodied as a flat slide. It has a substantially plate-shaped main slide element 27 which is arranged, or can be positioned, in such a way in front of the connecting face 8 that its main plane of extension is oriented at right angles in respect to the longitudinal axis 28 of the associated connecting opening 7. This longitudinal axis 28 is simultaneously the longitudinal axis of the conduit end section 12.

The state taken up by the holding slide 25 when it is positioned in such a way that the actuating axis 24 extends at right angles in respect to the longitudinal axis 28 will be called the switch-over stage in what follows. When taking up this switch-over stage, the holding slide 25 can be switched between a release position, shown in FIG. 1 in dash-dotted lines and in FIG. 8 in solid lines, and a holding position shown in FIGS. 3 and 7. The switch-over takes place by means of a shifting process, in which the holding slide 25 is shifted, in particular linearly, by manual actuation along the actuating axis 24.

Figures 9, 10:
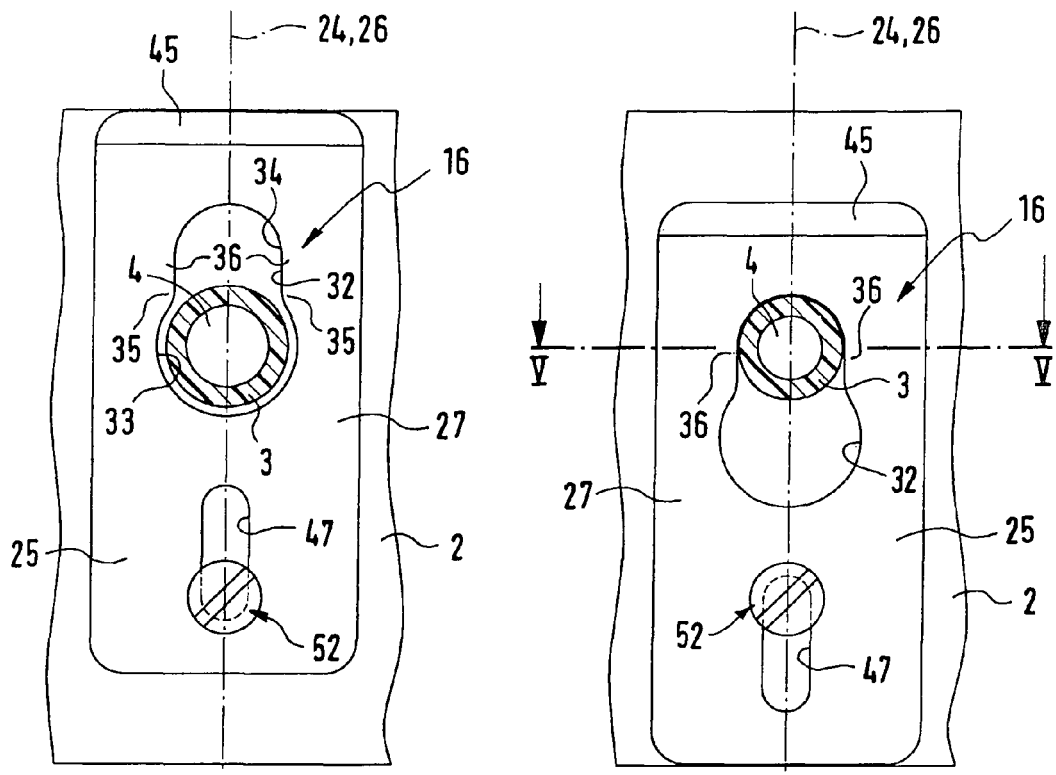
Figure 5:
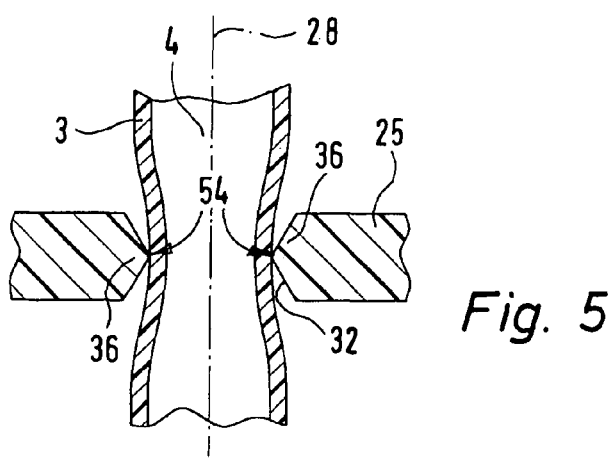

The holding position is also additionally represented in FIGS. 5 and 9, as well as in connection with the fluid-carrying hose 3 shown in the plugged-in state, also in FIGS. 1 and 6. FIG. 10 shows the release position.

A pass-through opening 32 extends through the holding slide 25 in the area of its main slide element 27. The opening has an elongated cross section and extends along the longitudinal axis 26. It has a cross section which changes over its length with an insertion section 33 of increased width and a holding section 34 of lesser width adjoining it. This shape can be obtained in the simplest way by means of a keyhole-like design of the pass-through opening 32, which can be seen particularly well in FIGS. 9 and 10.

The two front end sections of the elongated pass-through opening 32 are usefully concavely arched. The transition areas 35 between the two sections 33, 34 of the pass-through opening 32 are in particular rounded-off.

The width measurements of the insertion section 33 taken at right angles in respect to the actuating axis 24 are greater than the nominal exterior diameter of the fluid-carrying hose 3. The nominal exterior diameter of the fluid-carrying hose 3 is understood to be the exterior diameter measured in the undeformed state.

By means of this mutual matching it is assured that the fluid-carrying hose 3 can be pushed through the pass-through opening 32 without hindrance in the area of the insertion section 33.

In contrast to this, the correspondingly measured width of the holding section 34 is less than the nominal exterior diameter of the fluid-carrying hose 3. When the fluid-carrying hose 3 passes through the pass-through opening 32 in the area of the holding section 34, it is radially acted upon by the slide sections 36 which laterally delimit the holding section 34, which leads to the hose walls of the fluid-carrying hose 3 being elastically deformed, in particular in the radial direction. Because of a restoring force being created by this, a clamping fixation in place of the fluid-carrying hose 3 results in the holding section 34.

In accordance with the sectional view in FIG. 5, the fluid-carrying hose 3 can experience a certain amount of constriction by the slide sections 36 acting on it. This is illustrated in FIG. 5, but in an exaggerated manner. As a rule, the constriction will only be minimal, so that the fluid through-put through the fluid-carrying hose 3 is not restricted in any noticeable manner.

In the exemplary embodiment of FIGS. 6 to 10 the holding slide 25 is continuously in the position described above as the switch-over stage. For connecting a fluid-carrying hose 3, the holding slide 25 is positioned by shifting it along the actuating axis 24 in such a way that the insertion section 33 of the pass-through opening 32 is coaxially aligned with the connecting opening 7. This position is shown in FIGS. 8 and 10. It is now possible to insert the fluid-carrying hose 3 through the insertion section 33 into the conduit end section 12.

After this insertion, an actuating force $F_B$ is manually exerted on the holding slide 25. By means of this, the pass-through opening 32, with its holding section 34 transversely in respect to the longitudinal direction of the hose, is pushed onto the fluid-carrying hose 3. This results in the already mentioned holding position, in which the holding slide 25 is acted upon in a clamped manner in such a way that it can no longer be pulled out.

For releasing the fluid-carrying hose 3, it is merely necessary to displace the holding slide 25 in the opposite direction until it again takes up the release position, which allows the fluid-carrying hose 3 to be pulled out.

This explanation of the function correspondingly applies to the exemplary embodiment of FIGS. 1 to 4, but with the special feature, that here the holding slide 25 additionally has been provided with further mobility, which makes it possible to push the fluid-carrying hose 3 through the insertion section 33 at an earlier point in time. This further mobility option consists in a pivot movement, indicated by a two-headed arrow, in the direction of an approach to or a retreat from the connecting body 2. Here, in the pivoted-away state of the holding slide 25, the fluid-carrying hose 3 can be passed through the insertion section 33 and is subsequently inserted into the connecting opening 7 in the course of the holding slide 25 being pivoted against the connecting body 2. Once the holding slide 25 has been completely pivoted in, it is in the already explained switch-over stage, and it is now possible to perform switch-over into the holding position by means of the already explained exertion of the actuating force $F_B$.

All exemplary embodiments have in common, that the connected fluid-carrying hose 3 is itself directly inserted respectively through the pass-through opening 32 of the holding slide 25 into the connecting opening 7 of the connecting body 2. Thus, the interface of the connecting steps is directly located at the fluid-carrying hose, which therefore does not require any prior outfitting with any arbitrary additional connecting plugs.

The embodiment with a pivoting option 37 provided in addition to the linear displacement possibility is particularly suitable for a cost-effective form of realization with a holding slide 25 made of plastic material, which is formed in one piece on the connecting body 2, which in this respect also is made of a plastic material. It is possible here to produce the entire component in a cost-effective manner by means of plastic injection-molding technology, without there being the necessity to later fix the holding slides 25 mechanically in place on the connecting body 2.

In actuality, the exemplary embodiment of FIGS. 1 to 4 provides for the holding slide 25 to be suspended from the connecting body 2 by means of an elastically deformable hinge section 38, and this hinge section 38 offers the degree of freedom for the pivot movement 37, as well as for a linear movement of the holding slide 25 in the direction of its linear axis 26.

Usefully the hinge section 38 is located on one of the two linearly oriented end sections of the holding slide 25. When needed, it is possible by means of this hinge section 38 to provide the already mentioned one-piece connection between the holding slide 25 and the connecting body 2.

The holding slide 25 is preferably equipped with a first hook structure 42, in particular at its end opposite the hinge section 38. The hook structure is pointed in the direction toward the hinge section 38. A complementary first anchoring structure 43 is formed on the connecting body 2, by means of which the first hook structure 42 can be brought into a hooked engagement when the holding slide 25 is pivoted against it.

The hinge section 38 is usefully embodied in such a way that it normally maintains the holding slide 25 in a position which does not make it possible for the first hook structure 42 to come into or out of engagement with the first anchoring structure 43 merely by being pivoted. For taking these steps, a pull which is superimposed on the pivot movement 37, must be exerted on the holding slide 25 in the direction of its longitudinal axis 26, and thereby away from the hinge section 38. In the course of this, the hinge section 38 is elastically stretched and the first hook structure 42 can be moved across the first anchoring structure 43. During the subsequent release of the holding slide 25, a pull in the sense of coming into engagement with the first anchoring structure 43 is exerted by the hinge section 38 on the first hook structure 42.

Figure 4:
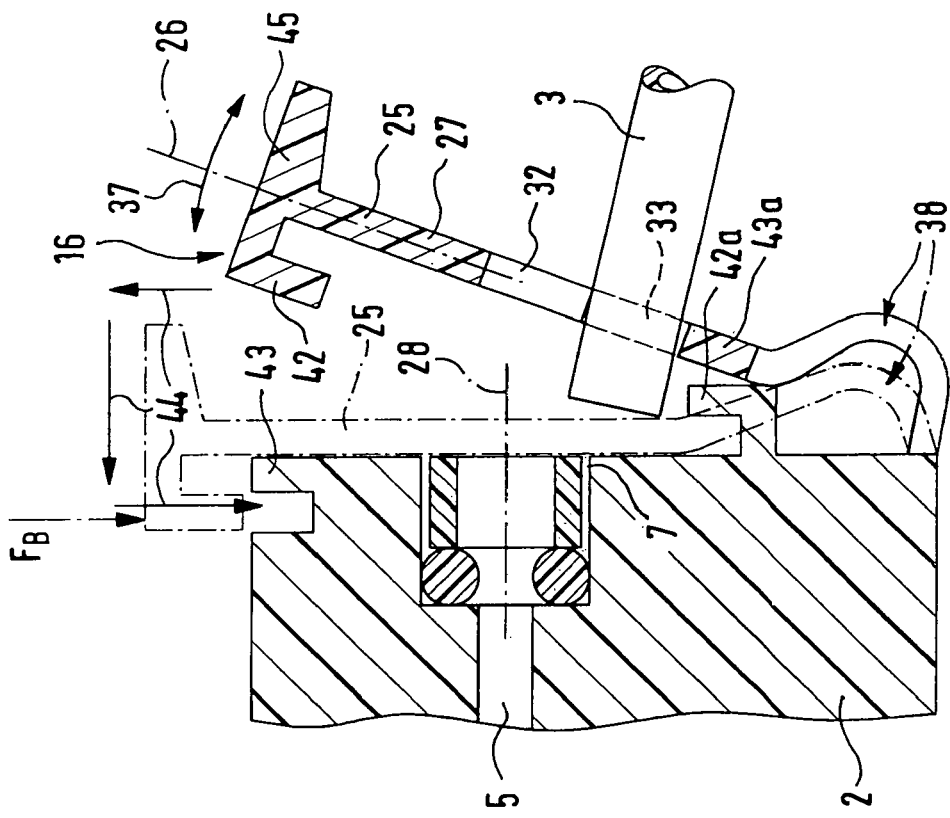

This sequence of movements is indicated in FIG. 4 by means of the three arrows 44.

In the course of this sequence of movements 44 it is already possible, as indicated in FIG. 4, for the fluid-carrying hose 3 to be pushed a short distance through the pass-through opening 32. Then, in the course of pivoting the holding slide 25 against the connecting body 2, it is threaded into the connecting opening 7. However, it is alternatively also possible to introduce the fluid-carrying hose 3 only after the holding slide 25 has been brought into the switch-over stage by its first hook structure 42 being positioned in the area of the first anchoring structure 43.

The tensile force caused by the elastic deformation of the hinge section 38 is normally not sufficient for shifting the holding slide 25 with the fluid-carrying hose 3 inserted into the holding position. Lately, the already mentioned actuating force $F_B$ has been applied here to this end. Simultaneously, the hooked engagement between the two structures 42, 43 is increased here.

The first hook structure 42 is usefully located at a head section 45 of the holding slide 25 which lies opposite the hinge section 38 and constitutes an actuating section at the same time, which is provided for manual action for the purpose of manipulating the holding slide 25.

Usefully, the hinge section 38 has a curved or bow-shaped structure. In the exemplary embodiment it is composed of two spring-elastic hinge bows 46 located next to each other, which can be functionally compared with a film hinge.

Because of the elasticity of the hinge section 38, it may under certain circumstances not be possible to assure a sufficiently solid fixation of the holding slide 25 in the holding position by means of the engagement of the first hook structure 42 with the first anchoring structure 43. It is therefore recommended to provide a second hook structure 42a at a position which lies at a distance in the direction of the actuating axis 24 and which can be brought into an anchoring engagement with a second anchoring structure 43a in a manner comparable with the first two structures 42, 43.

In the example, the second hook structure 42a is arranged on the connecting body 2, and the second anchoring structure 43a is located on the holding slide 25, although a reversed arrangement is also possible which, by the way, also applies to the first two structures 42, 43.

The second anchoring structure 43a is preferably constituted by the edge section of the holding slide 25 extending between the two hinge bows 46. Usefully, the second hook structure 42a projects away from the connecting face 8 and between the two hinge bows 46 in order to be able to extend behind the above mentioned edge section of the holding slide 25.

Two-point anchoring of the holding slide 25 in the holding position results, so that it can even withstand large tensional forces acting on the fluid-carrying hose 3.

In the exemplary embodiment in accordance with FIGS. 6 to 10 only a linear displaceability of the holding slide 25 is provided. The latter is a component which is usefully separate in respect to the connecting body 2 and can be made of plastic, as well as of metal. With its back, it rests against the connecting face 8 in a slidingly displaceable manner and has at least one elongated hole 47, which extends in the direction of the actuating axis 24 and through which a tensioning screw 48 extends. In this way the holding slide 25 lies between the connecting body 2 and the screw head 52 of the tensioning screw 48, and the screw head 52 has a diameter which is greater than the width of the elongated hole 47.

With the tensioning screw 48 loosened, but still screwed into the connecting body 2, it is possible to shift the holding slide 25 between the holding position and the release position. It is possible in this way to secure each one of these positions, but the holding position in particular can be secured by tightening the tensioning screw 48, so that the holding slide 25 is clamped in this way between the screw head 52 and the connecting body 2. An accidental release out of the holding position is prevented by this.

With the tensioning screw 48 loosened, the barrel 53 of the screw constitutes a bolt, which can work together as a guide element with the flanks of the elongated hole 47. In particular if, as in the exemplary embodiment, several holding slides 25 are arranged with their longitudinal axes located parallel side-by-side, it is possible that the desired displacement guidance already occurs by the mutual contact between the respectively adjoining holding slides 25 in the area of their longitudinal edges.

The screw barrel 53 or, alternatively another bolt passing through the elongated hole 47, can also form a stop which, by acting together with the slide sections delimiting the elongated hole at the front ends, limits the displacement path of the holding slide 25.

A manually operable actuating section 45 for introducing the actuating force for the displacement movement of the holding slide 25 is usefully also located at the one end of the holding slide 25 which is separately embodied in respect to the connecting body 2.

It can be seen in FIG. 5 that the slide sections 36, which delimit the holding section 34 on their long side, can have a cross-sectional structure tapering inward, in the direction toward the holding section 34. In particular, these slide sections 36 can taper in the form of a cutting edge, while forming a line-like engagement contour 54 which, under certain circumstances, can even minimally penetrate the material of the hose wall in order to literally sink its teeth into it and to create a positive resistance against unintentional pulling-out of the fluid-carrying hose 3.

The invention claimed is:

1. A fluid technology device comprising:
    at least one connecting body, the connecting body having at least one fluid-carrying conduit extending therethrough and terminating at an exterior of the connecting body in a connecting opening;
    at least one elastic fluid-carrying hose with elastomeric properties, which is or can be connected with the at least one fluid-carrying conduit; and
    a connecting arrangement for connecting the fluid-carrying hose with the fluid-carrying conduit by a plug-in connection, wherein the connecting arrangement comprises a holding slide, which is or can be seated on the connecting body so that the holding slide is displaceable in the direction of an actuating axis extending transversely in respect to the longitudinal axis of the connecting opening, the holding slide having a pass-through opening extending therethrough, the pass-through opening having an insertion section and a holding section, the holding section being narrower than the insertion section and adjoining the insertion section in the direction of the actuating axis, wherein the holding slide can be selectively positioned in a release position, in which the pass-through opening is aligned with the connecting opening, and in a holding position, in which the holding section is aligned with the connecting opening, and wherein the connected fluid-carrying hose itself is directly plugged through the pass-through opening of the holding slide into the connecting opening of the connecting body, and wherein the width of the pass-through opening in the area of the insertion section is greater than the nominal exterior diameter of the fluid-carrying hose, and the width of the pass-through opening in the area of the holding section is less than the nominal exterior diameter of the fluid-carrying hose such that, in the release position of the holding slide, the fluid-carrying hose can be passed unhindered through the pass-through opening into the connecting opening and can be pulled out of the pass-through opening again, and that, in the holding position of the holding slide, the fluid-carrying hose is clampingly fixed in place in a manner whereby a hose wall of the fluid-carrying hose is deformed by slide sections, which laterally delimit the holding section, but wherein a fluid through-put through the fluid-carrying hose is not substantially restricted.

2. The device in accordance with claim 1, wherein the pass-through opening is keyhole shaped.

3. The device in accordance with claim 1, wherein the slide sections, which delimit the holding section, have a cross-sectional contour which tapers in a radial inward direction.

4. The device in accordance with claim 3, wherein the slide sections which delimit the holding section are tapered to form cutting edges.

5. The device in accordance with claim 1, wherein the holding slide has at least one elongated hole extending in the direction of the actuating axis, through which a bolt extends, which is fixed in place on the connecting body.

6. The device in accordance with claim 5, wherein the bolt constitutes a stop which, in cooperation with the slide sections which delimit the longitudinal hole at the ends, defines the displacement path for the holding slide.

7. The linear drive in accordance with claim 5, wherein the bolt is constituted by the shaft of a tensioning screw, which has been screwed into the connecting body and whose screw head constitutes a clamping element, by means of which the holding slide can be releasably clamped together with the connecting body for securing its position.

8. The device in accordance with claim 1, wherein the holding slide is a component which is separate from the connecting body.

9. The device in accordance with claim 1, wherein the holding slide is made of metal.

10. The device in accordance with claim 1, wherein the holding slide is fixed on the connecting body in a movable manner by means of an elastically deformable hinge section in such a way that it can be displaced in the direction of its longitudinal axis, and can also be pivoted against the connecting body and away from it.

11. The device in accordance with claim 10, wherein the hinge section consists of at least one spring-elastically deformable hinge bow.

12. The device in accordance with claim 10, wherein, in the state in which it is pivoted against the holding body, the holding slide can be switched between an unlocked position, which makes pivoting possible, and a locked position, which prevents pivoting, by displacing it in the direction of its longitudinal axis, which coincides with the actuating axis.

13. The device in accordance with claim 10, wherein the holding slide is connected in one piece with the connecting body via the hinge section.

14. The device in accordance with claim 10, wherein the holding slide, the hinge section and the area of the connecting body connected with the hinge section consist of a plastic material.

15. The device in accordance with claim 1, wherein a centering sleeve, for enclosing the inserted fluid-carrying hose, has been inserted into a conduit end section of the fluid-carrying conduit adjoining the connecting opening.

16. The device in accordance with claim 15, wherein a seal ring, for surrounding the inserted fluid-carrying hose, has also been inserted into the conduit end section of the fluid-carrying conduit adjoining the connecting opening, the seal ring being axially arranged between the centering sleeve and a limitation face of the fluid-carrying conduit.

17. The device in accordance with claim 1, wherein a seal ring, for surrounding the inserted fluid-carrying hose, has been inserted into a conduit end section of the fluid-carrying conduit adjoining the connecting opening.

18. The device in accordance with claim 1, wherein a plurality of connecting openings, which follow each other in a line-up direction, are provided on the connecting body, to each of which a respective connecting arrangement with a holding slide is assigned, and the holding slides are arranged linearly next to each other with longitudinal axes, which are parallel in respect to each other.

19. The device in accordance with claim 18, wherein each holding slide has linear edge sections, and wherein adjoining holding slides rest against each other with their linear edge sections and guide each other.

20. The device in accordance with claim 1, wherein the connecting body is constituted by a valve support equipped with at least one valve.

21. A fluid technology device comprising:
at least one connecting body, the connecting body having at least one fluid-carrying conduit extending therethrough and terminating at an exterior of the connecting body in a connecting opening;
at least one elastic fluid-carrying hose with elastomeric properties, which is or can be connected with the at least one fluid-carrying conduit; and
a connecting arrangement for connecting the fluid-carrying hose with the fluid-carrying conduit by a plug-in connection, wherein the connecting arrangement comprises a holding slide, which is or can be seated on the connecting body so that the holding slide is displaceable in the direction of an actuating axis-extending transversely in respect to the longitudinal axis of the connecting opening, the holding slide having a pass-through opening extending therethrough, the pass-through opening having an insertion section and a holding section, the holding section being narrower than the insertion section and adjoining the insertion section in the direction of the actuating axis, wherein the holding slide can be selectively positioned in a release position, in which the pass-through opening is aligned with the connecting opening, and in a holding position, in which the holding section is aligned with the connecting opening, and wherein the connected fluid-carrying hose itself is directly plugged through the pass-through opening of the holding slide into the connecting opening of the connecting body, and wherein the width of the pass-through opening in the area of the insertion section is greater than the nominal exterior diameter of the fluid-carrying hose, and the width of the pass-through opening in the area of the holding section is less than the nominal exterior diameter of the fluid-carrying hose such that, in the release position of the holding slide, the fluid-carrying hose can be passed unhindered through the pass-through opening into the connecting opening and can be pulled out of the pass-through opening again, and that, in the holding position of the holding slide, the fluid-carrying hose is clampingly fixed in place, whereby a hose wall of the fluid-carrying hose is deformed by slide sections which laterally delimit the holding section, and
wherein the holding slide is fixed on the connecting body in a movable manner by means of an elastically deformable hinge section in such a way that it can be displaced in the direction of its longitudinal axis, and can also be pivoted against the connecting body and away from it, and
wherein, in the state in which it is pivoted against the holding body, the holding slide can be switched between an unlocked position, which makes pivoting possible, and a locked position, which prevents pivoting, by displacing it in the direction of its longitudinal axis, which coincides with the actuating axis, and
wherein at least one hook structure is arranged on the holding slide and/or on the connecting body, which can extend behind an anchoring structure formed on the respectively other element, so that bringing the hook structure and the anchoring structure in or out of the engagement can be accomplished by a displacement taking place in the direction of the actuating axis of the holding slide, which has been pivoted against the connecting body.

22. The device in accordance with claim 21, wherein the holding slide is acted upon by the hinge section in such a way that the at least one hook structure is acted upon in the engagement direction by the anchoring structure.

23. A fluid technology device comprising:
at least one connecting body, the connecting body having at least one fluid-carrying conduit extending therethrough and terminating at an exterior of the connecting body in a connecting opening;
at least one elastic fluid-carrying hose with elastomeric properties, the fluid-carrying hose being connectable with the at least one fluid-carrying conduit; and
a connecting arrangement for connecting the fluid-carrying hose with the fluid-carrying conduit by a plug-in connection, wherein the connecting arrangement comprises a holding slide and an elastically deformable hinge, the hinge connecting the holding slide to the connecting body in a movable manner whereby the holding slide is displaceable in the direction of an actuating axis-extending transversely in respect to the longitudinal axis of the connecting opening, and whereby the holding slide is also pivotable against and away from the connecting body, the holding slide having a pass-through opening extending therethrough, the pass-through opening having an insertion section and a holding section, the holding section being narrower than the insertion section and adjoining the insertion section in the direction of the actuating axis, wherein the holding slide can be selectively positioned in a release position, in which the pass-through opening is aligned with the connecting opening, and in a holding position, in which the holding section is aligned with the connecting opening, and wherein the connected fluid-carrying hose itself is directly plugged through the pass-through opening of the holding slide into the connecting opening of the connecting body, and wherein the width of the pass-through opening in the area of the insertion section is greater than the nominal exterior diameter of the fluid-carrying hose, and the width of the pass-through opening in the area of the holding section is less than the nominal exterior diameter of the fluid-carrying hose such that, in the release position of the holding slide, the fluid-carrying hose can be passed unhindered through the pass-through opening into the connecting opening and can be pulled out of the pass-through opening again, and that, in the holding position of the holding slide, the fluid-carrying hose is clampingly fixed in place, whereby a hose wall of the fluid-carrying hose is deformed by slide sections which laterally delimit the holding section.

* * * * *

UNITED STATES PATENT AND TRADEMARK OFFICE
CERTIFICATE OF CORRECTION

| | | |
|---|---|---|
| PATENT NO. | : 8,075,022 B2 | Page 1 of 1 |
| APPLICATION NO. | : 12/309700 | |
| DATED | : December 13, 2011 | |
| INVENTOR(S) | : Blassmann et al. | |

It is certified that error appears in the above-identified patent and that said Letters Patent is hereby corrected as shown below:

IN THE SPECIFICATION:

Column 7, line 7-8:

Now reads:    "can a metallic sleeve"

Should read:    --can be a metallic sleeve--

Signed and Sealed this
Twenty-eighth Day of August, 2012

David J. Kappos
*Director of the United States Patent and Trademark Office*